June 25, 1935. E. PAPPERT 2,006,278

RIMLESS ENDPIECE MOUNTING

Filed April 22, 1933 2 Sheets-Sheet 1

Inventor
*Emanuel Pappert*

By *Geo. P. Kimmel*
Attorney

June 25, 1935.  E. PAPPERT  2,006,278

RIMLESS ENDPIECE MOUNTING

Filed April 22, 1933   2 Sheets-Sheet 2

Inventor
Emanuel Pappert

By Geo. F. Kimmel
Attorney

Patented June 25, 1935

2,006,278

UNITED STATES PATENT OFFICE 2,006,278

RIMLESS ENDPIECE MOUNTING

Emanuel Pappert, Long Island City, N. Y., assignor to George P. Kimmel, Washington, D. C.

Application April 22, 1933, Serial No. 667,454

16 Claims. (Cl. 88—53)

This invention relates in general to spectacles and more particularly has reference to an endpiece for use in connection with rimless spectacles and to its arrangement in connection with spectacle lenses.

Previously, endpieces have been applied to spectacles of the rimless type by means of lens straps having portions adapted to engage the edges of the lenses along the temporal side thereof, and customarily having a pair of ears extending inwardly along the opposite faces of the lenses and attached thereto by means of screws or other suitable securing means. The endpiece proper has been secured to the structure just set forth, usually to the lens edge engaging portion of such structure.

Recently however there has come into popularity a type of spectacles in which the endpieces are positioned high with respect to the horizontal median of the spectacle lenses for the purpose of positioning the endpieces and the temples of the spectacles above the normal field of side vision of the wearer. Great difficulty has been encountered however in adapting previously used styles of endpieces to the high position with respect to the lens, considerable changes in shape and extent of the various parts being necessary in adapting the construction to its new application. Moreover, it has not been possible with endpieces previously in use to adjust the lateral position of the temple connection with respect to the lenses so as to accommodate various persons having faces of different widths. In some cases, it would be necessary to bow the temples out in order that they might extend around the side portions of the face and inwardly to the temple connections. In others, the temples even though straight would clear the side portions of the wearer's face in a much greater degree than was desirable.

Furthermore, when the old type of lens strap has been moved to the new high position, entirely different strains are placed upon it and much greater likelihood of breaking lenses is involved. At the same time, the shapes of the parts necessary in these previously used constructions have destroyed the straight line appearance so desirable in connection with spectacles of the high endpiece type and has thus rendered them less saleable.

It is therefore the object of this invention to provide an endpiece which will overcome the above difficulties encountered in connection with previously used constructions in that the position of the temple connection with respect to the lens may be readily predetermined in accordance with the requirements of the prospective wearer. At the same time, it is an object to provide an endpiece which may be very readily and firmly fixed to the lens in such a manner that the stresses involved in the high up position of the endpiece will be adequately taken care of in such a manner as not to fracture the lens, and at the same time to make it possible to obtain these structural advantages without destroying the desirable straight line appearance of the spectacles of the high endpiece type.

Other objects and advantages of this invention will become apparent from the following description taken in connection with the accompanying drawings, it being distinctly understood that the same are by way of example and illustration only and are not to be taken as in any way limiting the spirit or scope of this invention. The spirit and scope of this invention is to be limited only by the prior art taken in connection with the accompanying claims.

Referring now more particularly to the drawings in which like numerals indicate corresponding parts throughout:

Figure 1:
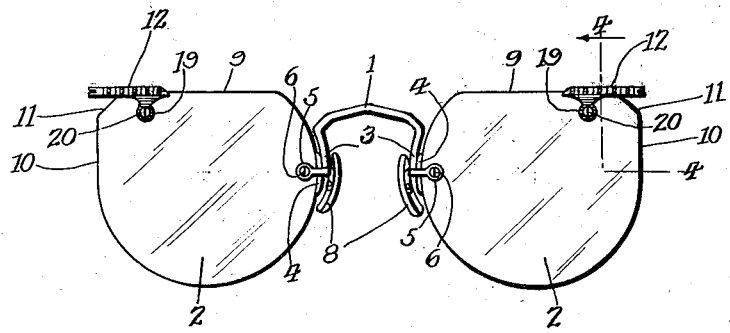
Figure 1 is a front view of a spectacle front embodying this invention.
Figure 2:
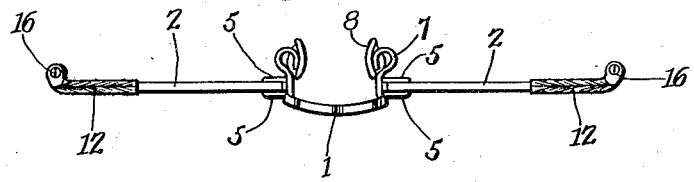
Figure 2 is a plan view of the construction illustrated in Figure 1.

In accordance with this invention, a bridge 1 of any suitable type is provided for the purpose of joining together the two rimless spectacle lenses 2. This bridge 1, as is customary, is provided with a pair of downwardly extending legs 3 which in turn carry the lens edge engaging portions 4 and the lens strap ears 5 which embrace the opposite faces of the lenses 2 adjacent the nasal edges thereof. These strap ears 5 are secured in place by means of screws 6 or other desirable means. Secured also to the lower ends of the bridge 1 are the rearwardly extending arms 7 carrying the customary nose rests 8 at their rearward ends.

For the purpose of this invention, the upper edges 9 of the lenses 2 are preferably made straight and so that when the spectacles are in normal position on the face of the wearer they will be horizontal. It will be noted in this instance, that the outer or temporal edges of these lenses 2 are formed with substantially vertical portions 10 and with upper inclined portions 11 joining the vertical portions 10 to the flat top edges 9 of the lenses.

Figure 3:
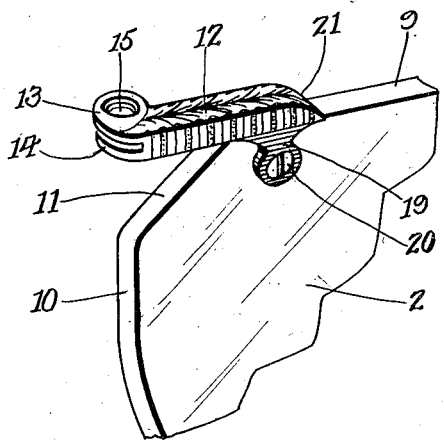
Figure 3 is an enlarged perspective view of one of the endpieces illustrated in Figures 1 and 2 showing its application to the edge of the lens.

As clearly illustrated in Figure 3, the endpiece proper consists of an arm 12 of any suitable material which is preferably slightly wider than the top edge 9 of the lens and of a thickness somewhat less than its width. At its outer or temporal end, this arm 12 is curved rearwardly and bifurcated to form a pair of rearwardly extending ears 13 and 14 adapted to receive the forward end of the temple between them. These ears are each formed with an opening 15 adapted to receive a screw 16 or the like for the purpose of pivotally connecting the forward end of a temple in place.

Figure 4:
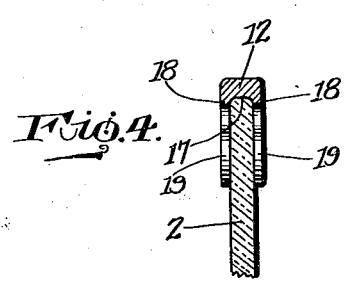
Figure 4 is a sectional view taken along the line 4—4 of Figure 1.
Figure 6:
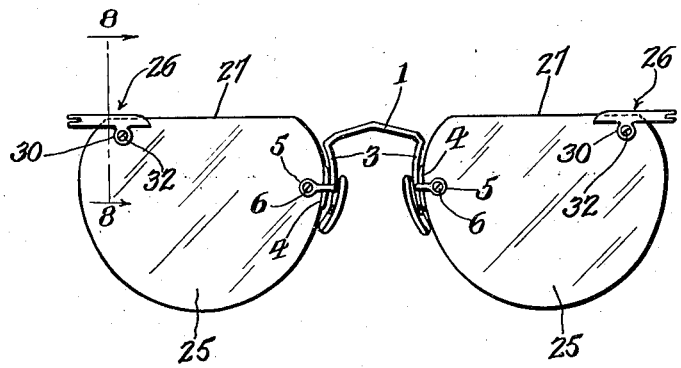
Figure 6 is a view similar to Figure 1 illustrating another modified form.
Figure 7:
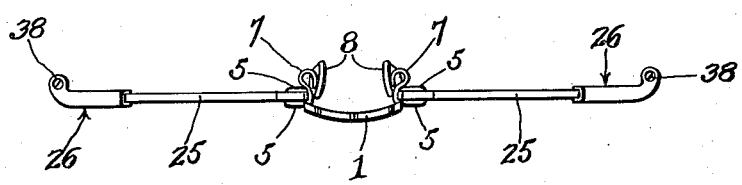
Figure 7 is a plan view of the device shown in Figure 6.

At its inner end, this arm 12 is formed to receive the outer end part of the straight top edge 9 of the lens 2. As clearly illustrated in Figure 4, the under surface of the arm 12 is cut away as at 17 to form a channel for receiving said outer end part of the top edge of the lens 2, thus forming a snug fit between these parts. This arrangement also provides a pair of downwardly extending flanges 18 on the opposite sides of the lens top edge and thus allows any stresses which are placed on the endpiece to be distributed along the entire edge of the lens which the arm 12 engages.

For the purpose of securing the arm 12 in place on the edge 9 of the lens 2, there are illustrated a pair of lens strap ears 19 adapted to extend downwardly from the flanges 18 and engage the front and rear faces respectively of the lens 2. These ears 19 are perforated adjacent their lower ends for the purpose of receiving a screw 20 or other suitable means for securing the endpiece firmly in position on the lens.

It is to be noted that the arm 12 is provided with a portion 21 which extends past the strap ears 19 and the screw 20, thus positively preventing the endpiece from swinging about the screw 20 as a pivot. This end 21 may be beveled off as illustrated for the purpose of forming a pleasing appearance without detracting from the strength of the structure.

Figure 5:
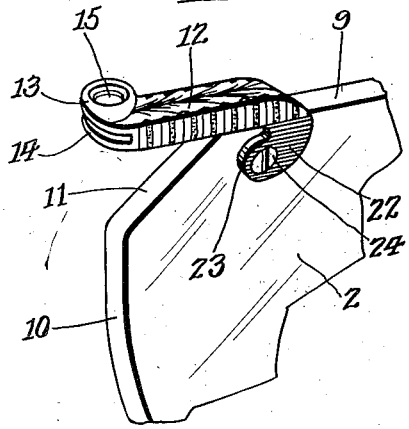
Figure 5 is a view similar to Figure 3 illustrating a modification.

With reference to the modified form illustrated in Figure 5, it will be seen that this endpiece consists likewise of an arm 12 having a rearwardly turned bifurcated end providing ears 13 and 14 perforated at 15 to form a temple connection. The strap ears 22 however instead of being formed in the manner of the strap ears 19 previously described are extended downwardly from substantially the end of the arm 12 and are then curved in a reverse direction so as to place their ends 23 in a position comparable to the ends of the straps 19. These ears 22 are likewise perforated to receive screws 24 or other suitable means for securing the endpieces in place on the lenses.

Referring now to the modified form illustrated in Figures 6 to 9 inclusive, it will be seen that the bridge 1 is the same as illustrated in Figure 1, but that the lenses 25 and the endpieces 26 are somewhat modified. The lenses 25 are formed with straight top edges 27 similar to the straight top edges 9 of the lenses 2. The outer side edges and upper corners however, instead of being made straight as in Figures 1 to 5 inclusive, are curved the same as the inner or nasal side edges. The curves below the horizontal medians of these lenses are of longer radius than the curves above these lines. Thus, in combination with the straight top they form a pleasing appearance and furnish a shape particularly adapted to receive either the endpieces 12 or 26.

Figure 8:
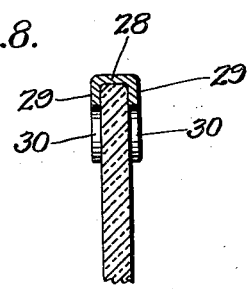
Figure 8 is an enlarged sectional view taken along the line 8—8 of Figure 6.
Figure 9:
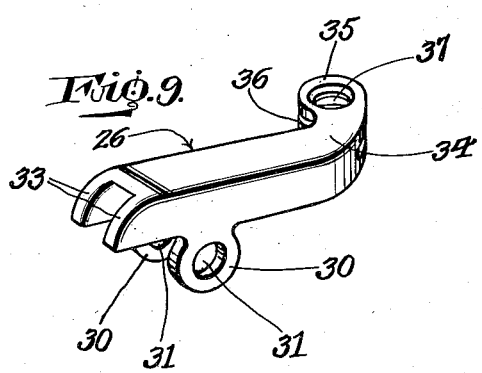
Figure 9 is an enlarged perspective of the endpiece shown in Figure 6.

These endpieces 26 are each formed from a sheet of material shaped to provide an arm 28 of channel formation and having a lens edge engaging portion and depending flanges 29 adapted to embrace the opposite faces of the lens. The depending flanges 29 are each provided with a strap ear 30, having an opening 31 therethrough for the purpose of receiving a screw 32 or other suitable securing means to secure the endpiece in place on the lens. The distance between the flanges 29 is such as to snugly receive the top straight edge 27 of a lens 25 as illustrated in Figure 8. The inner ends of the flanges 29 are cut away or rounded as at 33.

The outer or temple end of the endpiece may be formed in any suitable manner a separate piece or block of material 34 being preferably provided and soldered or otherwise suitably secured to the temple end of the arm 28, the connection being made as inconspicuous as possible. This block 34 is curved rearwardly and bifurcated to form a pair of rearwardly extending ears 35 and 36 adapted to receive the forward end of a temple between them. These ears are each formed with an opening 37 to receive a screw 38 or the like for the purpose of pivotally connecting the forward end of a temple in place.

From the foregoing, it will be seen that the temple connection of the endpiece of this invention may be so positioned with respect to the lens as to fit practically any width of face of a prospective wearer. This is accomplished by securing the endpiece with either more or less of its under surface in contact with the top edge of the lens, and it will be seen that the only limit for such positioning is first the extent of the lens itself and second the length of the endpiece, it being possible to position the lens strap ears comparatively very close to the temporal edge of the lens, or to position them so that the temple edge of the lens will be closely adjacent the temple connection.

In this connection, it is noted that the temple connection portion of each endpiece is curved to the rear and is disposed rearwardly of the plane of the lens itself. This enables the endpiece to be disposed on the lens in such a position that the temple connection will actually lie inwardly of a portion of the temple edge of the lens, and yet the temple edge of the lens will not interfere with the temple connection because it is offset rearwardly of the lens.

It will further be seen from the above that the endpieces of this invention are better adapted to transmit to the lenses any stresses which may be due to their high position, without breaking the lenses. Particularly is this true because of the grooved or cut away portion in the under face of each endpiece, which portion is adapted to receive and fit the top edge of the lens. By this expedient, the stresses are distributed along the entire portion of the upper edge of the lens which is contacted by the endpiece, and are not localized at the point immediately adjacent the strap ears.

While performing satisfactorily all of the mechanical functions pointed out, these endpieces at the same time maintain the desirable straight line appearance of spectacles of the high endpiece type because of the fact that the major portion of each of these endpieces lies in a normally horizontal plane and each extends directly toward the opposite endpiece.

It is understood that numerous changes may be made in the details and design of this invention without departing from the spirit or scope of the same as set forth in the appended claims.

What I claim is:—

1. An endpiece for rimless spectacles of the type having the lenses formed with straight, horizontal top edges comprising a horizontally disposed arm, said arm being formed with a channel for receiving the outer end part of the top edge of and for overlapping a lens in proximity to said edge whereby said top edge is arranged in parallelism to said arm, said channel opening at the inner end of said arm, and said arm being formed with spaced depending apertured ears opposing opposite faces of the lens and being adapted for the passage of holdfast means in proximity to the top edge of the lens for anchoring the latter and arm together, said arm having a portion thereof for projecting outwardly beyond the outer end of said edge, said arm having its outer end formed as a hinge connection for the forward end of a temple, and said ears having the apertures thereof positioned outwardly with respect to the inner end of said arm.

2. An endpiece for rimless spectacles of the type having the lenses formed with straight, horizontal top edges comprising a horizontally disposed arm, said arm being formed with a channel for receiving the outer end part of the top edge of and for overlapping a lens in proximity to said edge whereby said top edge is arranged in parallelism to said arm, said channel opening at the inner end of said arm, and said arm being formed with spaced depending apertured ears opposing opposite faces of the lens and being adapted for the passage of holdfast means in proximity to the top edge of the lens for anchoring the latter and arm together, said arm having a portion thereof for projecting outwardly beyond the outer end of said edge, said arm having its outer end formed as a hinge connection for the forward end of a temple, and said ears having the apertures thereof positioned outwardly with respect to the inner end of said arm, said ears being spaced from the inner end of said arm.

3. An end piece for rimless spectacles of the type having the lenses formed with straight, horizontal top edges comprising a horizontally disposed arm, said arm being formed with a channel for receiving the outer end part of the top edge of and for overlapping a lens in proximity to said edge whereby said top edge is arranged in parallelism to said arm, said channel opening at the inner end of said arm, and said arm being formed with spaced depending apertured ears opposing opposite faces of the lens and being adapted for the passage of holdfast means in proximity to the top edge of the lens for anchoring the latter and arm together, said arm having a portion thereof for projecting outwardly beyond the outer end of said edge, said arm having its outer end formed as a hinge connection for the forward end of a temple, and said ears having the apertures thereof positioned outwardly with respect to the inner end of said arm, said ears having their rear edges flush with the inner end of said arm.

4. An endpiece for rimless spectacles of the type having the lenses formed with straight, horizontal top edges comprising a horizontally disposed arm formed with means to enable it to seat upon and to depend below the outer end part of the top edge of a lens, said means including a pair of flanges for opposing opposite faces of the lens adjacent the outer end part of said edge, said arm having a portion thereof for projecting outwardly beyond the outer end of said top edge, said arm being formed with spaced depending apertured ears integral with said flanges, said ears being adapted for the passage of a holdfast device for anchoring the arm to the lens, and the outer end of said arm formed as a hinge connection for the forward end of a temple.

5. An endpiece for rimless spectacles of the type having the lenses formed with straight, horizontal top edges comprising a horizontally disposed arm formed with means to enable it to seat upon and to depend below the outer end part of the top edge of a lens, said means including a pair of flanges for opposing opposite faces of the lens adjacent the outer end part of said edge, said arm having a portion thereof for projecting outwardly beyond the outer end of said top edge, said arm being formed with spaced depending apertured ears integral with said flanges, said ears being adapted for the passage of a holdfast device for anchoring the arm to the lens, and the outer end of said arm formed as a hinge connection for the forward end of a temple, the said means being of less length than that of and arranged at the inner portion of said arm.

6. An endpiece for rimless spectacles of the type having the lenses formed with straight, horizontal top edges comprising a horizontally disposed arm formed with means to enable it to seat upon and to depend below the outer end part of the top edge of a lens, said means including a pair of flanges for opposing opposite faces of the lens adjacent the outer end part of said edge, said arm having a portion thereof for projecting outwardly beyond the outer end of said top edge, said arm being formed with spaced depending apertured ears integral with said flanges, said ears being adapted for the passage of a holdfast device for anchoring the arm to the lens, and the outer end of said arm formed as a hinge connection for the forward end of a temple, said ears being spaced from the inner end of said arm.

7. An endpiece for rimless spectacles of the type having the lenses formed with straight, horizontal top edges comprising a horizontally disposed arm formed with means to enable it to seat upon and to depend below the outer end part of the top edge of a lens, said means including a pair of flanges for opposing opposite faces of the lens adjacent the outer end part of said edge, said arm having a portion thereof for projecting outwardly beyond the outer end of said top edge, said arm being formed with spaced depending apertured ears integral with said flanges, said ears being adapted for the passage of a holdfast device for anchoring the arm to the lens, and the outer end of said arm formed as a hinge connection for the forward end of a temple, said ears having their rear edges flush with the inner end of said arm.

8. An endpiece for rimless spectacles of the type having the lenses formed with straight, horizontal top edges comprising a horizontally disposed arm formed with means to enable it to seat upon and to depend below the outer end part of the top edge of a lens, said means including a pair flanges for opposing opposite faces of the lens adjacent the outer end part of said edge, said arm having a portion thereof for projecting outwardly beyond the outer end of said top edge, said arm being formed with spaced depending apertured ears integral with said flanges, said ears being adapted for the passage of a holdfast device for anchoring the arm to the lens, and the outer end of said arm formed as a hinge connection for the forward end of a temple, said arm being of a length whereby the inner end thereof, when the arm is anchored to the lens is spaced from the inner end of said top edge.

9. An endpiece for rimless spectacles of the type having the lenses formed with straight, horizontal top edges comprising a horizontally disposed arm, said arm being formed with a channel for receiving the outer end part of the top edge of and for overlapping a lens in proximity to said edge whereby said top edge is arranged in parallelism to said arm, said channel opening at the inner end of said arm, and said arm being formed with spaced depending apertured ears opposing opposite faces of the lens and being adapted for the passage of holdfast means in proximity to the top edge of the lens for anchoring the latter and arm together, said arm having a portion thereof for projecting outwardly beyond the outer end of said edge, said arm having its outer end formed as a hinge connection for the forward end of a temple, and said ears having the apertures thereof positioned outwardly with respect to the inner end of said arm, said arm being of a length whereby the inner end thereof, when the arm is anchored to the lens is spaced from the inner end of said top edge.

10. An endpiece for rimless spectacles of the type having the lenses formed with straight, horizontal top edges comprising a horizontally disposed arm formed with means to enable it to seat upon and to depend below the outer end part of the top edge of a lens, said means including a pair of flanges for opposing opposite faces of the lens adjacent the outer end part of said edge, said arm having a portion thereof for projecting outwardly beyond the outer end of said top edge, said arm being formed with spaced depending apertured ears integral with said flanges, said ears being adapted for the passage of a holdfast device for anchoring the arm to the lens, and the outer end of said arm formed as a hinge connection for the forward end of a temple, and said ears having the apertures thereof positioned outwardly with respect to the inner end of said arm.

11. An endpiece for rimless spectacles of the type having the lenses formed with straight, horizontal top edges comprising a horizontally disposed arm formed with means to enable it to seat upon and to depend below the outer end part of the top edge of a lens, said means including a pair of flanges for opposing opposite faces of the lens adjacent the outer end part of said edge, said arm having a portion thereof for projecting outwardly beyond the outer end of said top edge, said arm being formed with spaced depending apertured ears integral with said flanges, said ears being adapted for the passage of a holdfast device for anchoring the arm to the lens, and the outer end of said arm formed as a hinge connection for the forward end of a temple, the said means being of less length than and opening at the inner end of said arm.

12. In an end piece for rimless spectacles of the type having the lenses formed with straight, horizontal top edges, a horizontally disposed arm formed with means for seating upon and overlapping the top edge of a lens, said arm having a portion thereof projecting outwardly beyond the outer end of said top edge when the arm is in seating and overlapping positions with respect to said edge, said arm having as parts thereof a pair of spaced apertured depending ears for opposing opposite faces of the lens when the arm is in seating and overlapping positions with respect to said edge, the apertures in said ears being for the passage of holdfast means for anchoring the arms and lens together, and said ears having the apertures thereof arranged outwardly with respect to the inner end of the arm.

13. In combination, a lens having a straight, horizontal top edge, an arm seating upon and overlapping a portion of said edge, said arm being extended outwardly from the outer end of said edge and having its outer end formed with a hinge connection for the forward end of a temple, apertured ears depending from said arm and opposing the front and rear faces of the lens, and holdfast means extending through the ears and lens for anchoring the latter and arm positioned together, said ears having the apertures thereof, with respect to said arm intermediate the ends of the latter.

14. An end piece for rimless spectacles of the type having the lenses formed with straight, horizontal top edges comprising an arm formed with means for seating upon and overlapping the outer end portion of the top edge of a lens and with spaced apertured ears extended from the said means for opposing the front and rear faces of the lens and for the passage of a holdfast device for anchoring the lens and arm together, the said ears having their apertures, with respect to said arm positioned intermediate the ends of the latter, the said means being open at the inner end of the arm, and said arm having its outer end in the form of a hinge connection for a temple.

15. An end piece for rimless spectacles of the type having the lenses formed with straight, horizontal top edges comprising an arm-like body having a part thereof formed with means for seating upon and overlapping the outer end portion of the top edge of a lens, said body having another part thereof in the form of a pair of depending spaced apertured ears extending from the said other part for opposing the front and rear faces of the lens, said ears for the passage of a holdfast device for anchoring said body and lens together, the said means having its inner end positioned at the inner end of said body, the inner end of said means being open, and said body having the remaining part thereof in the form of an extension disposed laterally with respect to the outer end of the top edge of the lens, closing the outer end of the said means and having its outer end formed with means to provide a temple hinge connection.

16. An end piece for rimless spectacles of the type having the lenses formed with straight, horizontal top edges comprising an arm-like body having a part thereof formed with means for seating upon and overlapping the outer end portion of the top edge of a lens, said body having another part thereof in the form of a pair of depending spaced apertured ears extending from the said other part for opposing the front and rear faces of the lens, said ears for the passage of a holdfast device for anchoring said body and lens together, the said means having its inner end positioned at the inner end of said body, the inner end of said means being open, and said body having the remaining part thereof in the form of an extension disposed laterally with respect to the outer end of the top edge of the lens, closing the outer end of the said means and having its outer end formed with means to provide a temple hinge connection, the apertures in said ears being disposed, with respect to said body between the transverse median and inner end of the latter.

EMANUEL PAPPERT.